United States Patent [19]
Gottzman et al.

[11] Patent Number: 5,820,654
[45] Date of Patent: Oct. 13, 1998

[54] INTEGRATED SOLID ELECTROLYTE IONIC CONDUCTOR SEPARATOR-COOLER

[75] Inventors: Christian Friedrich Gottzman, Clarence; Ravi Prasad, E. Amherst, both of N.Y.

[73] Assignee: Praxair Technology, Inc., Danbury, Conn.

[21] Appl. No.: 848,199

[22] Filed: Apr. 29, 1997

[51] Int. Cl.$^6$ .................................................. B01D 53/22
[52] U.S. Cl. ..................................... 95/54; 95/39; 96/11
[58] Field of Search ........................ 55/267–269; 95/45, 95/54; 96/4, 8, 10, 11; 422/120, 129, 149, 168, 173, 198, 205, 239

[56] References Cited

U.S. PATENT DOCUMENTS

| | | | |
|---|---|---|---|
| 1,685,759 | 9/1928 | Walter | 95/54 X |
| 3,550,355 | 12/1970 | Remus et al. | 95/54 |
| 3,847,672 | 11/1974 | Trocciola et al. | 96/4 X |
| 3,849,076 | 11/1974 | Gryaznov | 96/11 X |
| 3,901,669 | 8/1975 | Seitzer | 95/54 X |
| 4,120,663 | 10/1978 | Fally | 422/239 X |
| 4,590,044 | 5/1986 | Mos et al. | 422/205 X |
| 5,108,465 | 4/1992 | Bauer et al. | 95/54 |
| 5,160,713 | 11/1992 | Mazanec et al. | 423/210 |
| 5,169,415 | 12/1992 | Roettger et al. | 95/54 |
| 5,229,102 | 7/1993 | Minet et al. | 422/239 X |
| 5,240,473 | 8/1993 | Carolan et al. | 95/54 |
| 5,240,480 | 8/1993 | Thorogood et al. | 95/54 X |
| 5,306,411 | 4/1994 | Mazanec et al. | 204/265 |
| 5,342,431 | 8/1994 | Anderson et al. | 95/45 |
| 5,384,051 | 1/1995 | McGinness | 422/239 X |
| 5,384,101 | 1/1995 | Rockenfeller | 96/11 X |
| 5,447,555 | 9/1995 | Yee et al. | 95/54 |
| 5,480,620 | 1/1996 | Cameron | 422/239 X |
| 5,516,359 | 5/1996 | Kang et al. | 95/14 |
| 5,547,494 | 8/1996 | Prasad et al. | 95/54 |
| 5,552,039 | 9/1996 | McBrayer, Jr. et al. | 422/205 X |
| 5,565,017 | 10/1996 | Kang et al. | 95/14 |
| 5,599,383 | 2/1997 | Dyer et al. | 96/8 |
| 5,611,931 | 3/1997 | Liu et al. | 210/653 |
| 5,614,001 | 3/1997 | Kosaka et al. | 96/11 X |
| 5,681,373 | 10/1997 | Taylor et al. | 96/11 |
| 5,702,999 | 12/1997 | Mazanec et al. | 95/54 X |
| 5,712,220 | 1/1998 | Carolan et al. | 95/54 X |

FOREIGN PATENT DOCUMENTS

| | | | |
|---|---|---|---|
| 0732138 | 9/1996 | European Pat. Off. | |
| 0747108 | 12/1996 | European Pat. Off. | |
| 6-134244 | 5/1994 | Japan | 96/8 |
| 0573444 | 10/1977 | U.S.S.R. | 96/8 |
| 1472104 | 4/1989 | U.S.S.R. | 96/8 |
| 2257054 | 1/1993 | United Kingdom | 95/54 |

OTHER PUBLICATIONS

Bevc et al., "SureCell Integrated Solid Oxide Fuel Cell Power Plants for Distributed Power Applications", Power-Gen 1995–Americas, pp. 1–18 (1995).

*Primary Examiner*—Robert Spitzer
*Attorney, Agent, or Firm*—Douglas E. Denninger

[57] ABSTRACT

A process for producing and oxygen gas stream, an oxygen-enriched gas stream, or a reaction product stream as a permeate stream and an oxygen-depleted retentate gas stream by first separating oxygen from a feed gas stream and thereafter cooling at least the permeate stream. The production and cooling of the permeate stream occurs within a single apparatus having at least one ion transport membrane.

20 Claims, 9 Drawing Sheets

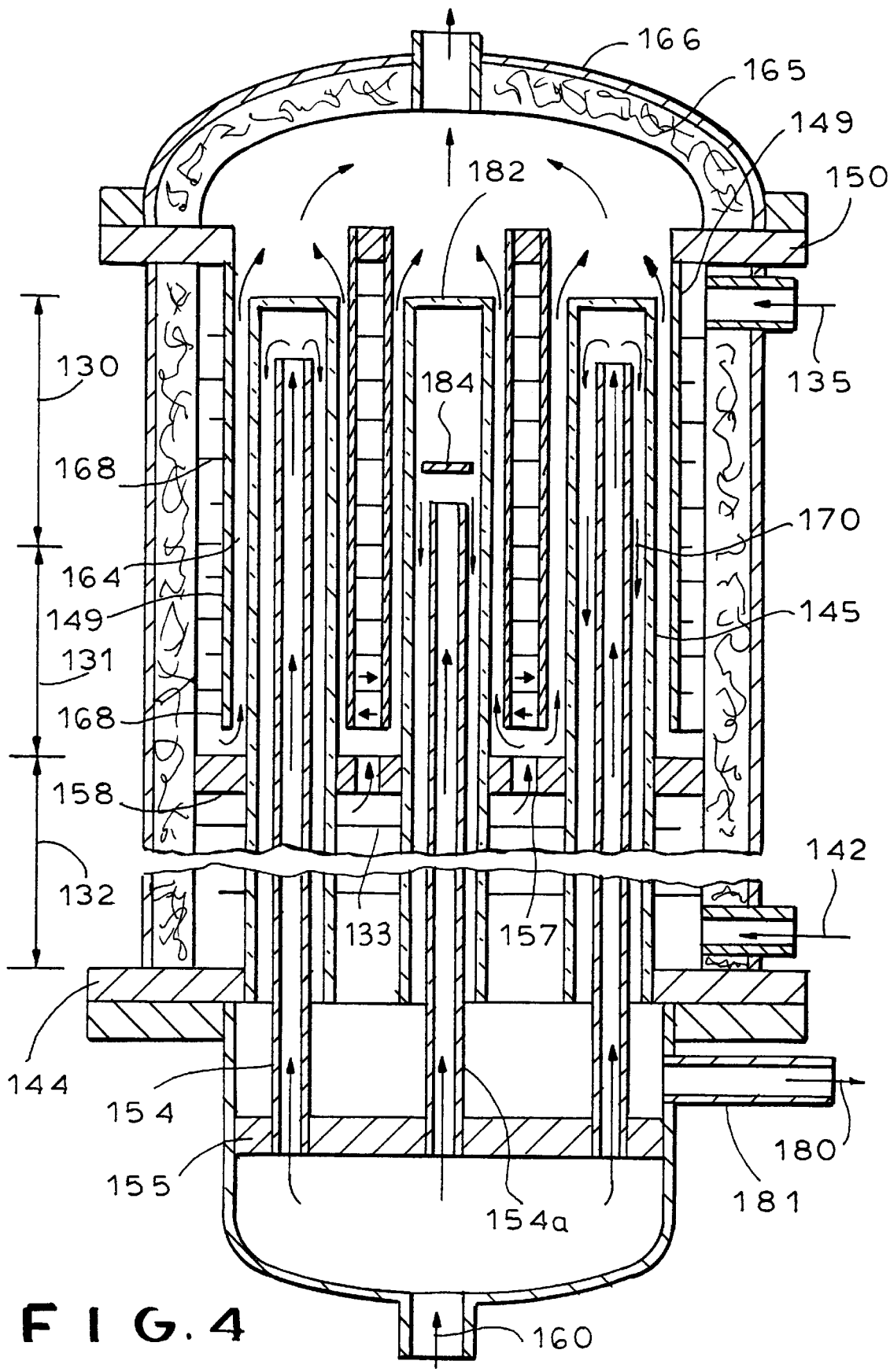
F I G. 4

ID SOLID ELECTROLYTE IONIC
CONDUCTOR SEPARATOR-COOLER

U.S. GOVERNMENT RIGHTS

This invention was made with United States Government support under Cooperative Agreement No. 70NANB5H1065 awarded by the National Institute of Standards and Technology. The United States Government has certain rights in the invention.

CROSS-REFERENCE

The application entitled "Solid Electrolyte Ionic Conductor Reactor Design", U.S. Ser. No. 08/848,204, filed concurrently herewith, is incorporated herein by reference.

FIELD OF THE INVENTION

The invention relates to solid electrolyte ionic conductor apparatus designs for use in gas separating systems In particular, the invention relates to solid electrolyte ionic conductor systems where gas separation, possible reaction, and cooling functions are integrated within a single apparatus.

BACKGROUND OF THE INVENTION

Non-cryogenic bulk oxygen separation systems, for example, organic polymer membrane systems, have been used to separate selected gases from air and other gas mixtures. Air is a mixture of gases which may contain varying amounts of water vapor and, at sea level, has the following approximate composition by volume: oxygen (20.9%), nitrogen (78%), argon (0.94%), with the balance consisting of other trace gases. An entirely different type of membrane, however, can be made from certain inorganic oxides. These solid electrolyte membranes are made from inorganic oxides, typified by calcium- or yttrium-stabilized zirconium and analogous oxides having a fluorite or perovskite structure.

Although the potential for these oxide ceramic materials as gas separation membranes is great, there are certain problems in their use. The most obvious difficulty is that all of the known oxide ceramic materials exhibit appreciable oxygen ion conductivity only at elevated temperatures. They usually must be operated well above 500° C., generally in the 600° C.–900° C. range. This limitation remains despite much research to find materials that work well at lower temperatures. Solid electrolyte ionic conductor technology is described in more detail in Prasad et al., U.S. Pat. No. 5,547,494, entitled Staged Electrolyte Membrane, which is hereby incorporated by reference to more fully describe the state of the art.

Recent developments have produced solid oxides which have the ability to conduct oxygen ions at elevated temperatures if a chemical or electrical driving potential is applied. These pressure-driven ionic conductor materials may be used as membranes for the extraction of oxygen from oxygen-containing gas streams if a sufficient partial oxygen pressure ratio is applied to provide the chemical driving potential. Since the selectivity of these materials for oxygen is infinite and oxygen fluxes several orders of magnitude higher than for polymeric membranes can be obtained, attractive opportunities are created for the production of oxygen as well as for oxygen-requiring oxidation processes, especially with applications that involve elevated temperatures. A prominent example is gas turbine cycles which typically process a significant amount of excess air to keep the turbine inlet temperature within the capabilities of available materials and therefore make available excess oxygen for recovery as a by-product Advances in the state of the art of air separation using solid electrolyte ionic conductors have been presented in the technical literature. For example, Mazanec et al., U.S. Pat. No. 5,306,411, entitled Solid Multi-Component Membranes, Electrochemical Reactor Components, Electrochemical Reactors and Use of Membranes, Reactor Components, and Reactor for Oxidation Reactions, relates to electrochemical reactors for reacting an oxygen-containing gas with an oxygen-consuming gas and describes a shell and tube reactor with the oxygen-containing gas flowing on one side of the solid electrolytic membrane and the oxygen-consuming gas on the other. Mazanec et al., however, does not address issues related to heat management to maintain membrane surfaces at the desired uniform temperatures, flow dynamics to achieve effective mass transfer, or the need for balancing reaction kinetics with oxygen ion conductivity to maintain the appropriate oxygen partial pressure for materials stability.

Kang et al., U.S. Pat. No. 5,565,017, entitled High Temperature Oxygen Production with Steam and Power Generation, relates to a system integrating an ion transport membrane with a gas turbine to recover energy from the retentate gas stream after it is heated and steam is added.

Kang et al., U.S. Pat. No. 5,516,359, entitled Integrated High Temperature Method for Oxygen Production, relates to the use of steam and inert gases as sweep gases for membrane separators. Neither of the Kang et al. patents disclose the design of the enabling apparatus nor do they contemplate the use of ion transport reactors which, by excluding nitrogen from the reaction product gas stream, enable their use as purge or sweep gas stream generators for ion transport separators.

A tubular solid-state membrane module is disclosed in Dyer et al., U.S. Pat. No. 5,599,383, having a plurality of tubular membrane units, each unit having a channel-free porous support and a dense mixed conducting oxide layer supported thereon. The porous support of each unit is in flow communication with one or more manifolds or conduits to discharge oxygen which has permeated through the dense layer and the porous support.

Westinghouse has developed solid oxide fuel cells having a tubular design, such as described in the publication presented at PowerGen 1995—Americas Conference in Anaheim, California, on December 5–7, 1995, by Frank P. Bvec and Walter G. Parker, SureCELL™ Integrated Solid Oxide Fuel Cell Power Plants for Distributed Power Applications. This publication relates to tubular solid oxide fuel systems with geometries that have superficial similarity to some of the geometries of the present invention but the geometries are not, however, related to the functions performed by solid electrolyte reactors of the instant invention. Bvec and Parker describe a closed end fuel cell element where the air is supplied to the inner cathode side of the solid electrolyte membrane by a coaxial inside tube which results in the air being preheated before entering the cathode passage where oxygen transfer takes place. Bvec and Parker, however, do not address issues of heat management and flow dynamics.

In addition, the Westinghouse device, unlike the present invention, is not a reactor to produce heat or a desired anode side product but a fuel cell to produce electric power and therefore cannot employ mixed or dual phase conductors as the electrolyte. Furthermore, the Westinghouse solid oxide fuel cell designs (see FIG. 4) are also low pressure devices while the reactors of the present invention would typically see elevated pressure at least on one side of the solid electrolyte membrane. Since the pressure differential between the two sides is small the sealing issue is not addressed, although it is a significant part of the present invention. The Westinghouse fuel cell designs also feature a concentric inner tube for the feed air, however, without consideration of the practical problems of apparatus design faced by an ion transport oxygen separator.

OBJECTS OF THE INVENTION

It is therefore an object of the invention to provide an efficient process using a solid electrolyte ionic conductor systems where gas separation, possible reaction, and cooling functions are integrated within a single apparatus to maximize the use of conventional materials and conventional construction methods.

It is also an object of the invention to have the solid electrolyte ion transport systems of the invention integratable into a high temperature cycle such as a gas turbine.

It is a further object of the invention to provide the ability to employ a purge stream for the permeate or anode side of the ion transport separator to enhance oxygen recovery without interfering with the previously mentioned advantages.

It is yet another object of the invention to integrate a reaction section into the apparatus which generates a purge stream, consisting of reaction product, within the same tubular passage upstream from the separator section to purge the permeate, anode side of the separator to enhance oxygen recovery without interfering with the previously discussed advantages and thereby integrate most of the unit operations required for gas separation by ion transport membrane s in a single apparatus to significantly simplify process arrangements.

SUMMARY OF THE INVENTION

The invention comprises a process for producing an oxygen gas stream or oxygen-enriched gas stream as a permeate stream and an oxygen-depleted gas stream as a retentate stream by first separating oxygen from a feed gas stream containing elemental oxygen and thereafter cooling the oxygen gas stream or oxygen-enriched gas stream obtained therefrom, within a single separator-cooler apparatus. The separator-cooler apparatus has a separator section and a cooling section and an oxygen product exit port, wherein the separator section includes an ion transport membrane having a retentate side and a permeate side. The process comprises the steps of: (a) compressing the feed gas stream; (b) dividing the compressed feed gas stream into a major gas stream portion and a minor gas stream portion; (c) heating the major gas stream portion; (d) introducing the heated major gas stream portion into the separator section of the apparatus; (e) introducing the minor gas stream portion into the cooling section of the apparatus near the oxygen product exit port; (f) removing oxygen from the heated major gas stream portion through the ion transport membrane of the separator section to obtain a hot oxygen-enriched gas stream on the permeate side of the membrane and an oxygen-depleted gas stream on the retentate side of the membrane; and (g) transferring heat from the oxygen-enriched gas stream to the minor gas stream portion to produce the oxygen gas stream or the oxygen-enriched product gas stream and a heated minor gas stream portion, wherein the minor gas stream portion either exits the apparatus or is combined with the heated major gas stream portion before the heated major gas portion is introduced into the separator portion of the apparatus, and wherein the oxygen-depleted gas stream exits the apparatus.

In a preferred embodiment of the invention, the separator-cooler apparatus further comprises a reactor section, including an ion transport membrane having a retentate side and a permeate side to establish a single reactor-cooler apparatus or a single reactor-separator-cooler apparatus. In the reactor-separator-cooler apparatus, a reactive gas stream is introduced on the permeate side of the ion transport membrane in the reactor section of the apparatus, to react with a second oxygen gas stream permeating through the ion transport membrane near the permeate side of the ion transport membrane, to produce a reaction product gas stream which is used to purge the permeate side of the ion transport membrane in the separator section of the apparatus, and the reaction product gas stream and the first oxygen gas stream and any unreacted oxygen from the second oxygen gas stream are combined as the oxygen-enriched gas stream which exits the apparatus, and wherein the oxygen-depleted gas stream separately exits the apparatus The ion transport membrane of the separator section of the apparatus and the ion transport membrane of the reactor section of the apparatus may be integrally formed, and more preferably, the ion transport membrane of the separator section of the apparatus includes a porous supporting substrate and comprises an ion transport material having high oxygen conductivity at high oxygen partial pressure and the ion transport membrane of the reactor section of the apparatus comprises a mixed conductor layer having optimum stability at low oxygen partial pressure.

The invention also comprises a process for producing an oxygen-depleted gas stream and a reaction product gas stream as a permeate stream by first separating oxygen from a feed gas stream containing elemental oxygen to produce the oxygen-depleted gas stream and a hot reaction product gas stream and thereafter cooling the reaction product gas stream, within a single reactor-cooler apparatus, to obtain the reaction product gas stream. The reactor-cooler apparatus has a reactor section and a cooling section and a reaction product exit port, and the reactor section includes an ion transport membrane having a retentate side and a permeate side. The process comprises the steps of: (a) compressing the feed gas stream; (b) dividing the compressed feed gas stream into a major gas stream portion and a minor gas stream portion; (c) introducing the major gas stream portion into the reactor section of the apparatus; (d) introducing the minor gas stream portion into the cooling section of the apparatus near the reaction product exit port; (e) removing oxygen from the major gas stream portion through the ion transport membrane of the reactor section, by introducing a reactive gas stream on the permeate side of the ion transport membrane in the reactor section of the apparatus to react with the oxygen gas stream permeating through the ion transport membrane near the permeate side of the ion transport membrane, to produce the hot reaction product gas stream on the permeate side of the ion transport membrane and the oxygen-depleted gas stream on the retentate side of the ion transport membrane; and (f) transferring heat from the hot reaction product gas stream to the minor gas stream portion to produce the reaction product gas stream and a heated minor gas stream portion, wherein the minor gas stream portion either exits the apparatus or is combined with the heated major gas stream portion before the heated major gas portion is introduced into the reactor portion of the apparatus, and wherein the oxygen-depleted gas stream also exits the apparatus. The invention is applicable to any oxidation or partial oxidation reaction on the permeate side of the ion transport reactor. Examples of such applications include combustors, dissociation devices, syngas production or other oxidation processes.

In a preferred embodiment of the invention, the major gas stream portion is heated to an intermediate temperature before it is introduced into the reactor section of the apparatus. In another preferred embodiment of the invention, the reaction product gas stream is essentially devoid of nitrogen. In another preferred embodiment of the invention, the ion transport membrane of the reactor section of the apparatus and a conduit for carrying the reaction product gas stream through the cooler section of the apparatus are integrally formed.

The invention also comprises a process for producing an oxygen-enriched gas stream and oxygen-depleted gas stream by separating oxygen from a feed gas stream containing elemental oxygen within a reactor-separator apparatus. The reactor-separator apparatus has a separator section and a reactor section, wherein the separator and reactor sections include at least one ion transport membrane having a retentate side and a permeate side. The process comprises the steps of: (a) compressing the feed gas stream; (b) introducing into compressed feed gas stream into the apparatus and transferring heat from a reaction products gas stream; (c) removing oxygen from the heated feed gas stream through the ion transport membrane in the reactor section of the apparatus to produce a reaction product gas stream on the permeate side of the membrane and the oxygen-depleted gas stream on the retentate side of the membrane; and (d) removing additional oxygen from the partially oxygen-depleted gas stream by transport through the ion transport membrane in the separator section of the apparatus to produce the oxygen-depleted gas stream on the retentate side of the membrane. A reactive gas stream is introduced on the permeate side of the ion transport membrane in the reactor section of the apparatus to react with oxygen transporting through the ion transport membrane near the permeate side of the membrane to produce the reaction product gas stream which is used to purge the permeate side of the ion transport membrane in the separator section of the apparatus, and the reaction product gas stream and unreacted transported oxygen are combined as the oxygen-enriched gas stream which exits the apparatus. Preferably, the oxygen-depleted gas stream separately exits the apparatus.

In a preferred embodiment of the invention, the ion transport membrane of the separator section of the apparatus and the ion transport membrane of the reactor section of the apparatus are integrally formed. In another preferred embodiment of the invention, the ion transport membrane of the separator section of the apparatus includes a porous supporting substrate and comprises an ion transport material having high oxygen ion conductivity at high oxygen partial pressure and the ion transport membrane of the reactor section of the apparatus comprising a mixed conductor layer having optimum stability at low oxygen partial pressure. In yet another preferred embodiment of the invention, the reactive gas is heated before it is introduced into the reactor section of the apparatus.

As used herein the term "elemental oxygen" means any oxygen that is uncombined with any other element in the Periodic Table. While typically in diatomic form, elemental oxygen includes single oxygen atoms, triatomic ozone, and other forms uncombined with other elements.

As used herein, the term "reactor" means a separator in which the transported oxygen undergoes a chemical reaction and the oxygen is consumed thereby. While the terms "reactor" and "separator" are used herein at times to describe different sections of an apparatus according to the present invention, the term "separator" is also used herein to broadly describe reactor and/or separator sections

BRIEF DESCRIPTION OF THE DRAWINGS

Other objects, features and advantages of the invention will occur to those skilled in the art from the following description of preferred embodiments of the invention and the accompanying drawings, in which:

FIG. 4 is a schematic diagram of another embodiment of the invention showing a basic design of a solid electrolyte ionic conductor reactor-separator-cooler featuring an ion transport tube with a closed and free-floating end;

DETAILED DESCRIPTION OF THE INVENTION

Figure 1A:
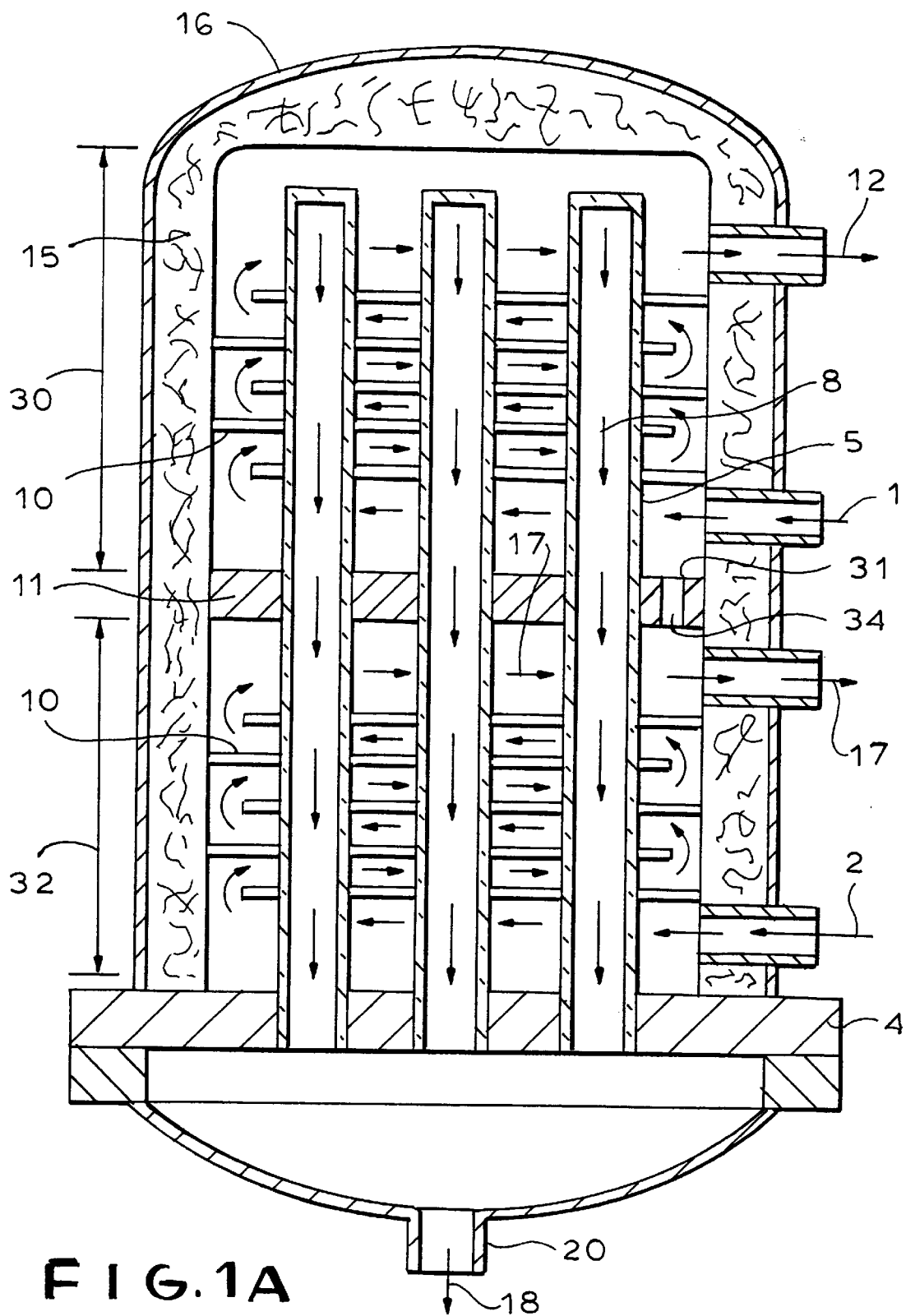
FIG. 1A is a schematic diagram of an embodiment of the invention showing a basic design of a solid electrolyte ionic conductor separator-cooler featuring an ion transport tube with a closed and free-floating end.

Some of the key problems that are addressed by the present invention involve minimizing gaseous diffusion resistance, avoiding excessive stresses from thermal and compositional expansion and contraction and sealing the ion transport elements within the ion transport apparatus. The latter problem is aggravated by the fact the ion transport membrane operating temperature are in the range from 500° C. to 1100° C. The invention, which in preferred embodiments employs ion transport elements in the form of tubes, eliminates the above-mentioned stresses by using tubes which are close-ended and free-floating on that end. The sealing problem is also eased substantially by combining the ion transport separation and/or reaction functions with oxygen cooling in a single apparatus. As discussed later, this preferably enables the tube-to-tube sheet joints to be kept in a temperature range from 180° C. to 300° C. and allows the use of conventional techniques such as welding, brazing, or mechanical means to effect a seal. In the preferred approach, part of the feed air bypasses the combustor or heater and serves as the heat sink for cooling the oxygen product or exiting reaction product gas stream. The diffusional resistance on the high pressure gas is minimized by a baffle arrangement that provides high crossflow velocities or by small hydraulic radii of flow passages.

Other functions, such as indirect heating of a third gas stream or a separation of an oxygen product stream by a suitable solid electrolyte membrane, are integrated to achieve optimum simplicity while satisfying the operational requirements discussed in the previous paragraph.

This invention provides all the functional requirements which solid electrolyte reactors must satisfy to be feasible and practical and discloses how the reactor function can be advantageously combined with other operations. Specifically, the invention incorporates heat transfer means such that the heat of reaction is removed from the solid electrolyte ionic conductor elements, thereby maintaining the solid electrolyte ionic conductor elements at fairly constant temperature. This is achieved by varying local heat transfer coefficients as necessary by the selection of appropriate heat transfer surface geometry and of appropriate local flow velocities. At the same time, efficient mass transfer of oxygen to the cathode surface and reactant to the anode surface of the membrane is assured by either high turbulence or narrow passage dimensions. In addition, attention is paid to the need for maintaining oxygen partial pressure at or near the anode surface at a level sufficiently high for long life of the specific mixed or dual phase conductor employed by balancing local oxygen flux and reaction kinetics. This is achieved by selection of a membrane with appropriate ion conductivity and thickness on the one hand and controlling catalytic activity by catalyst material and or surface area on the other.

As mentioned above, the present invention utilizes many fundamental approaches to mitigate or eliminate the problems encountered in an ion transport separator apparatus. The greatest advantages present in at least some of the various embodiments of the invention presented in the figures are as follows: (i) free-floating and closed tube ends avoid stresses due to differential thermal or compositional expansion; (ii) the incorporation of the cooler into the ion transport separator apparatus avoids the need for a separate and expensive high-temperature oxygen cooler with additional tube sheets and shell; (iii) the combination of the separator with the cooler in the same apparatus allows the tube sheets to remain at a moderate temperature, permitting reasonably high design stresses with relatively inexpensive materials and conventional tube-to-tube sheet joints; (iv) an insulated vessel allows inexpensive materials of construction to be used in the shell; (v) the use of baffles and high gas velocities enhances mass and heat transfer; (vi) the use of a portion of the oxygen-containing feed gas provides a heat sink for cooling the oxygen product gas stream; and (vii) installation and piping are simplified.

The solid electrolyte ionic conductor tubes used in the embodiments of the invention usually consist either of a dense wall solid oxide mixed or dual phase conductor or a thin film solid oxide mixed or dual phase conductor supported by a porous substrate. The solid electrolyte ionic conductor material must have sufficient ability to conduct oxygen ions and electrons in the temperature range from 500° C. to 1100° C. at the prevailing oxygen partial pressures when a chemical potential difference is maintained across the solid electrolyte ionic conductor membrane surface caused by a ratio in oxygen partial pressures across the solid electrolyte ionic conductor membrane. Suitable solid electrolyte ionic conductor materials are perovskites and dual phase metal-metal oxide combinations as listed in Table I. Since the reactive environment on the anode side of the solid electrolyte ionic conductor membrane in many applications creates very low partial oxygen pressures, the chromium-containing perovskites of Table I may be the preferred material since these tend to be stable in this environment, that is, they are not chemically decomposed at very low partial oxygen pressures. Optionally, porous catalyst layers to enhance chemical reactions and/or achieve higher surface area for exchange may be added to both sides of the solid electrolyte ionic conductor membrane to enhance the chemical reactions on these surfaces when necessary. These porous catalyst layers, however, may be the same perovskite solid electrolyte material as used in the ion transport tubes. Alternatively, the surface layer of the solid electrolyte ionic conductor membrane may be doped, for example, with cobalt, to enhance surface exchange kinetics.

TABLE I

Material composition

1. $(La_{1-x}Sr_x)(Co_{1-y}Fe_y)O_{3-\delta}$ ($0 \leq x \leq 1$, $0 \leq y \leq 1$, $\delta$ from stoichimetry)
2. $SrMnO_{3-\delta}$
   $SrMn_{1-x}Co_xO_{3-\delta}$ ($0 \leq x \leq 1$, $0 \leq 1$, $\delta$ from stoichimetry)
   $Sr_{1-x}Na_xMnO_{3-\delta}$
3. $BaFe_{0.5}Co_{0.5}YO_3$
   $SrCeO_3$
   $YBa_2Cu_3O_{7-\beta}$ ($0 \leq \beta \leq 1$, $\beta$ from stoichimetry)
4. $La_{0.2}Ba_{0.8}Co_{0.8}Fe_{0.2}O_{2.6}$, $Pr_{0.2}Ba_{0.8}Co_{0.8}Fe_{0.2}O_{2.6}$
5. $A_xA'_{x'}A''_{x''}B_yB'_{y'}B''_{y''}O_{3-z}$ (x, x', x", y, y', y" all in 0–1 range)
   where: A, A', A" = from groups 1, 2, 3 and f-block lanthanides
   B, B', B" = from d-block transition medals
6. (a) Co—La—Bi type:  Cobalt oxide      15–75 mole %
                       Lanthanum oxide   13–45 mole %
                       Bismuth oxide     17–50 mole %
   (b) Co—Sr—Ce type:  Cobalt oxide      15–40 mole %
                       Strontium oxide   40–55 mole %
                       Cerium oxide      15–40 mole %
   (c) Co—Sr—Bi type:  Cobalt oxide      10–40 mole %
                       Strontium oxide    5–50 mole %
                       Bismuth oxide     35–70 mole %
   (d) Co—La—Ce type:  Cobalt oxide      10–40 mole %
                       Lanthanum oxide   10–40 mole %
                       Cerium oxide      30–70 mole %
   (e) Co—La—Sr—Bi type: Cobalt oxide    15–70 mole %
                       Lanthanum oxide    1–40 mole %
                       Strontium oxide    1–40 mole %
                       Bismuth oxide     25–50 mole %
   (f) Co—La—Sr—Ce type: Cobalt oxide    10–40 mole %
                       Lanthanum oxide    1–35 mole %
                       Strontium oxide    1–35 mole %
                       Cerium oxide      30–70 mole %
7. $Bi_{2-x-y}M'_xM_yO_{3-\delta}$ ($0 \leq x \leq 1$, $0 \leq y \leq 1$, $\delta$ from stoichimetry)
   where: M' = Er, Y, Tm, Yb, Th, Lu, Nd, Sm, Dy, Sr, Hf, Th, Ta, Nb, Pb, Sn, In, Ca, Sr, La and mixtures thereof
   M = Mn Fe, Co, Ni, Cu and mixtures thereof
8. $BaCe_{1-x}Gd_xO_{3-x/2}$ where,
   x equals from zero to about 1.
9. One of the materials of $A_sA'_tB_uB'_vB''_wO_x$ family whose composition is disclosed in U.S. Pat. No. 5,306,411 (Mazanec et al.) as follows:
   A represents a lanthanide or Y, or a mixture thereof;
   A' represents an alkaline earth metal or a mixture thereof;
   B represents Fe;

TABLE I-continued

Material composition

B' represents Cr or Ti, or a mixture thereof;
B" represents Mn, Co, V, Ni or Cu, or a mixture thereof;
C and s, t, u, v, w, and x are numbers such that:
s/t equals from about 0.01 to about 100;
u equals from about 0.01 to about 1;
v equals from zero to about 1;
w equals from zero to about 1;
x equals a number that satisfies the valences of the A, A', B, B', B"
in the formula; and $0.9 < (s + t)/(u + v + w) < 1.1$ 10. One of the materials $La_{1-x}Sr_xCu_{1-y}M_yO_{3-\delta}$ family, where:
M represents Fe or Co;
x equals from zero to about 1;
y equals from zero to about 1;
$\delta$ equals a number that satisfies the valences of La, Sr, Cu, and M in the formula.

11. One of the materials of $Ce_{1-x}A_xO_{2-\delta}$ family, where:
A represents a lanthanide, Ru, or Y; or a mixture thereof;
x equals from zero to about 1;
y equals from zero to about 1;
$\delta$ equals a number that satisfies the valences of Ce and A in the formula.

12. One of the materials of $Sr_{1-x}Bi_xFeO_{3-\delta}$ family, where:
A represents a lanthanide or Y, or a mixture thereof;
x equals from zero to about 1;
y equals from zero to about 1;
$\delta$ equals a number that satisfies the valences of Ce and A in the formula.

13. One of the materials of $Sr_xFe_yCO_zO_w$ family, where:
x equals from zero to about 1;
y equals from zero to about 1;
z equals from zero to about 1;
w equals a number that satisfies the valences of Sr, Fe and Co in the formula.

14. Dual phase mixed conductors (electronic/ionic):
$(Pd)_{0.5}/(YSZ)_{0.5}$
$(Pt)_{0.5}/(YSZ)_{0.5}$
$(B-MgLaCrO_x)_{0.5}(YSZ)_{0.5}$
$(In_{90\%}Pt_{10\%})_{0.6}/(YSZ)_{0.5}$
$(In_{90\%}Pt_{10\%})_{0.5}/(YSZ)_{0.5}$
$(In_{95\%}Pr_{2.5\%}Zr_{2.5\%})_{0.5}/(YSZ)_{0.5}$
Any of the materials described in 1–13, to which a high temperature metallic phase (e.g., Pd, Pt, Ag, Au, Ti, Ta, W) is added.

In the design it is also important to balance local oxygen flux and reaction kinetics to make sure that local oxygen partial pressures are at level assuring material stability, that is, typically above $10^{-15}$ atm. for presently known materials. The oxygen flux will be a complex function dependent on material ionic conductivity, solid electrolyte wall thickness, reaction kinetics, the fuel partial pressure, and catalytic activity, which can be influenced by catalyst selection and catalyst extended area Gas flow on the reaction side of the solid electrolyte tubes can be counter-current or concurrent. The direction of gas flow can be important under some circumstances since it will affect local reaction kinetics and oxygen partial pressure environments. The latter aspect does have an effect on oxygen flux, material stability and compositional stresses.

In general, the major gas stream portion is heated to an intermediate temperature before it is introduced into the reactor section of the apparatus, which enhances the efficiency of the process. If, however, the apparatus includes a reactor section and it is desired to maximize the capacity of the reactor to generate heat from the reaction of the permeating oxygen gas stream and the reactive gas stream, the major gas stream portion is not heated before it is introduced into the apparatus.

FIG. 1A shows a schematic drawing of an ion transport separator-cooler. Generally, a feed gas stream containing elemental oxygen is compressed and divided into two portions to be fed into the separator-cooler apparatus. While the minor gas stream portion of cool feed gas stream 2 is fed directly into the apparatus, the major gas stream portion is usually heated to produce hot feed gas stream 1 before it is used. During operation, hot feed gas stream 1 is introduced into separator section 30 and cool feed gas stream 2, at a temperature preferably in the range from 80° C. to 250° C., is fed into cooler section 32. Since the gas stream pressures are essentially equal in separator section 30 and cooler section 32 of the apparatus, only baffle 11 is needed to separate the two sections. Baffle 11 need not be insulated but may be. Ion transport separator-cooler tubes 5 traverse both sections 30 and 32. Ion transport separator-cooler tubes 5 are capped and free-floating at the upper end of the apparatus as shown and are attached and sealed to tube sheet 4 at the bottom of the apparatus as shown. Since tube sheet 4 will be at a temperature of less than 300° C., standard techniques of joining, such as welding, brazing or local tube expansion (rolling in), o-rings, or other mechanical means can be employed to effect the ion transport separator-cooler tube 5-tube sheet 4 joint. Ion transport tubes 5 must be able to expand freely to accommodate axial growth resulting from thermal and compositional expansion. Insulation 15 insulates the structural pressure-containing walls 16 of the apparatus to permit use of standard materials of construction, for example, stainless steel or carbon steel.

Tube 5 can be employed in both separator section 30 and cooler section 32 of the apparatus. Because the material making up ion transport separator-cooler tubes 5 will conduct oxygen ions at elevated temperature but will be essentially impermeable at lower temperatures, it can act as a separation membrane in separator section 30 and as a heat transfer surface in cooler section 32 To achieve the high oxygen fluxes required, separator-cooler tubes 5 made from a composite consisting of a thin dense separating layer supported by a porous substrate are preferred. The dense separating layer of such separator-cooler tubes 5 are made from a material that has high oxygen ion conductivity at high oxygen partial pressures. As noted previously, suitable materials are the mixed and dual phase conductors of Table I. A preferred material is $La_{1-x}Sr_xCo_{1-y}Fe_yO_{3-}$. The porous substrate can be made from the same material or consist of one or several layers of other materials which are chemically compatible with adjacent materials at operating temperatures. Possible alternate materials can be less expensive oxides such as zirconia, ceria, yttria, alumina or metals such as chrome-nickel containing superalloys. Optionally, separator-cooler tubes 5 can be coated with a porous catalyst layer on both the retentate side and permeate side of the ion transport section to respectively enhance dissociation and recombination of oxygen. On the anode (permeate) side, the catalytic function is best performed by a porous layer adjacent to or contiguous with the dense separating layer.

Figure 1B:
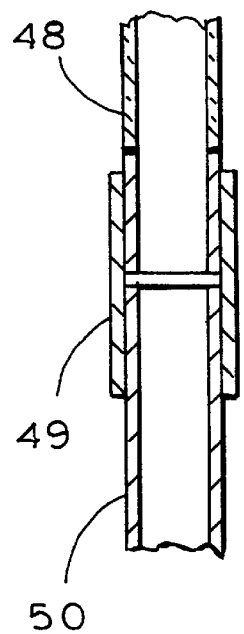
FIG. 1B is a schematic diagram showing a detail of how the ion transport tube of the separator section of the apparatus may be joined with the metal tube of the cooling section of the apparatus by welding, brazing, or mechanical joining the tubes to effect a seal.

Since an ion transport separation tube will likely be more expensive than a cooler tube it may be appropriate to employ a metallic cooler tube which is joined to the ion transport separator tube by welding or brazing with the joint located in the upper cooler section. A detail of such a joint is shown in FIG. 1B. Separator-cooler tubes 5 illustrated in FIG. 1B have three parts: ion transport tube 48 having a metallized end, sleeve 49, and cooler tube 50. The tube ends of ion transport tube 48 and cooler tube 50 are brazed or welded to sleeve 49. Another option is to use the same substrate tube for separator section 30 and cooler section 32 but substitute an inexpensive dense sealing layer for the ion transport layer in the part of separator-cooler tubes 5 in cooler section 32. This is especially attractive if a metallic porous substrate is employed.

Returning to FIG. 1A, hot feed gas stream 1 flows past the outside surface of separator-cooler tubes 5 directed by baffles 10. Oxygen from hot feed gas stream 1 permeates through separator-cooler tubes 5 to provide hot oxygen gas stream 8 in the interior of separator-cooler tubes 5. Hot feed gas stream 1, depleted of oxygen, becomes oxygen-depleted gas stream 12 and exits separator portion 30 of the apparatus. As cool feed gas stream 2 flows cross-counter currently to hot oxygen gas stream 8 inside separator-cooler tubes 5 directed by baffles 10, hot oxygen gas stream 8 flows from separator section 30 towards cooler section 32 and is thereby cooled by heat transfer with cool feed gas stream 2 to become an oxygen product gas stream 18 which exits the apparatus by product exit port 20. Cool feed gas stream 2, now at elevated temperature, is withdrawn as hot gas stream 17 and may be added to hot feed gas stream 1. Alternately, hot gas stream 17 can be joined with hot feed gas stream 1 within the apparatus, for example, by means of a conduit 34 through the baffle 11 with an opening 31. As before, hot feed gas stream 1, augmented by hot gas stream 17, flows through separator section 30 in cross counter flow to hot oxygen gas stream 8 while oxygen permeates through separator-cooler tubes 5.

Figure 2:
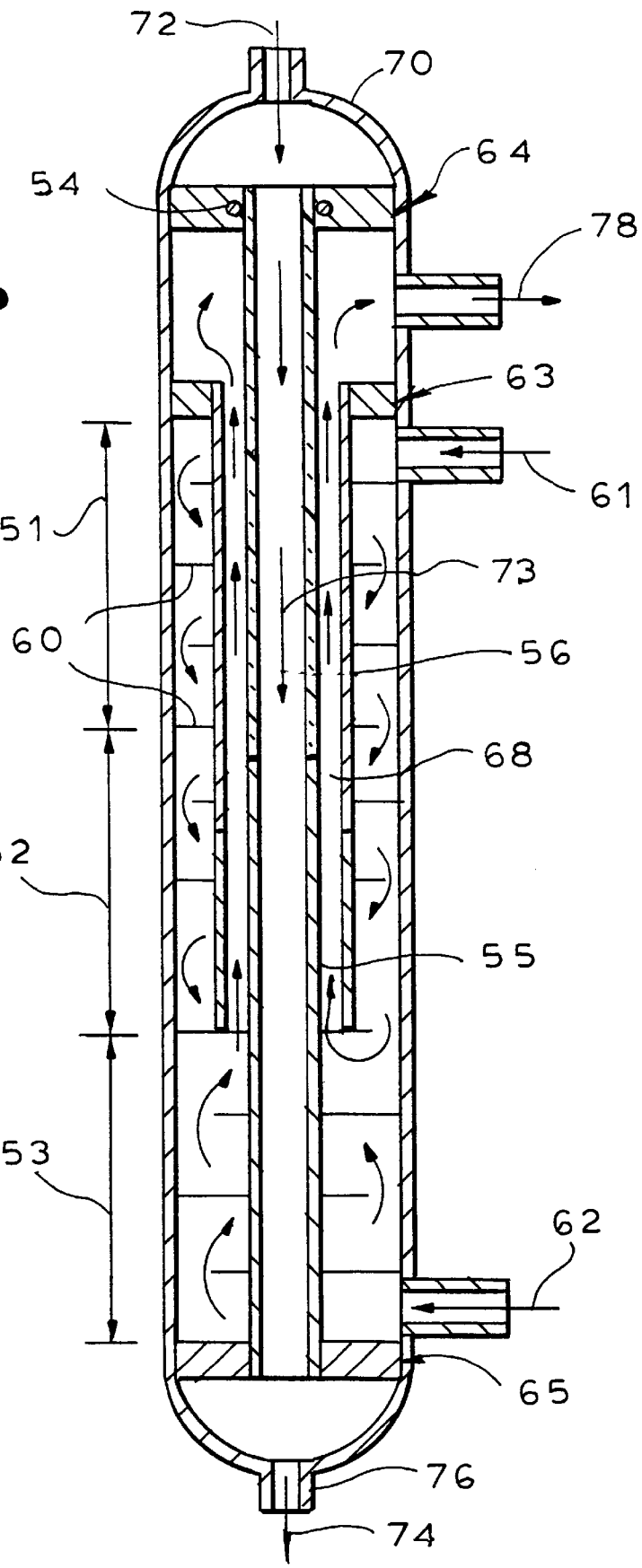
FIG. 2 is a schematic diagram of another embodiment of the invention showing a basic design of a solid electrolyte ionic conductor reactor-separator-cooler featuring an ion transport through tube with a sliding seal.

FIG. 2 is a schematic diagram of another embodiment of the invention showing a basic design of a solid electrolyte ionic conductor reactor-separator-cooler including an ion transport through tube with a sliding seal 54. As in FIG. 1A, a feed gas stream containing elemental oxygen is compressed and divided into two portions to be fed into the reactor-separator-cooler apparatus. During operation, feed gas stream 61 is introduced into reactor section 51 and cool feed gas stream 62 is fed into cooler section 53. Ion transport reactor-separator-cooler tube 55 traverses all sections 51, 52, and 53. Ion transport reactor-separator-cooler tube 55 is attached to tube sheet 64 at the upper end of the apparatus by means of sliding seal 54 or a fixed seal with a bellows and is attached and sealed to tube sheet 65 at the bottom of the apparatus. Since tube sheet 65 will be at a temperature of less than 300° C., standard techniques of joining, such as welding, brazing or local tube expansion (rolling in), o-rings, or other mechanical means can be employed to effect the ion transport reactor-separator-cooler tube 55-to-tube sheet 65 joint. Tube sheets 64 and 65, however, are at a more elevated temperature and different methods of effecting a seal are generally employed. Although not shown, insulation insulates the structural pressure-containing walls 70 of the apparatus to permit use of standard materials of construction, for example, stainless steel or carbon steel.

Figure 7:
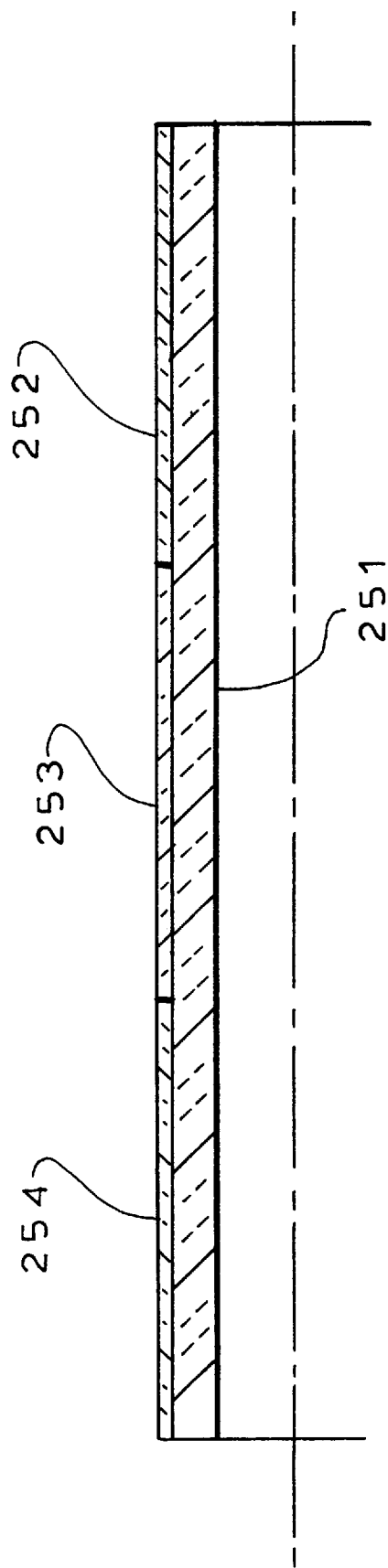
FIG. 7 is a schematic cross sectional diagram showing an ion transport tube wherein the ion transport membrane of the reactor section of the apparatus, the ion transport membrane of the separator section of the apparatus, and the conduit of the cooler section of the apparatus are integrally formed.

Tube 55 can be employed in reactor section 51, separator section 52, and cooler section 53 of the apparatus. As mentioned with regard to FIGS. 1A and 1B, an ion transport separation and reaction tube will likely be more expensive than a cooler tube and it may be appropriate to employ a metallic cooler tube which is joined to the ion transport separator tube and ion transport reactor tube by welding or brazing with the joint located in the upper cooler section. Alternately, a single composite tube can be employed that has a different composition in each of the various sections 51, 52, and 53, optimized for the particular function to be performed in each section. A cross section of such a composite tube is shown in FIG. 7. In these composite tubes, a porous substrate 251 supports a thin dense separating layer. The reactor section of the tube is coated with a mixed conductor layer 252 having optimum stability at low oxygen partial pressure, the separator section with a material 253 having high conductivity at high oxygen partial pressures, and the cooler section of the tube with an inexpensive sealing layer 254. As with FIG. 1B, the cooling section of the tube may also be made from a different material (for example, metal) and be joined to the composite ion transport tube that comprises the reactor and separation sections. Therefore, a single composite tube can be employed in reactor section 51, separator section 52, and cooler section 53 of the apparatus.

Returning to FIG. 2, feed gas stream 61 flows past the outside surface of shroud tube 56 below tube sheet 63 as directed by baffles 60 and is warmed by heat transfer with shroud tube 56 and flows into concentric annular passage 68 formed between the outer surface of reactor-separator-cooler tube 55 and the inner surface of shroud tube 56. Shroud tube 56 extends beyond reactor section 51 through separator section 52 of the apparatus. Reactive gas stream 72, for example, methane optionally diluted with steam, flows down reactor-separator cooler tube 55 and reacts with the oxygen permeating from feed gas stream 61 through reactor-separator-cooler tube 55 to provide reaction product gas stream 73 in the interior of tube 55. When reactive gas stream 72 consists of methane or another hydrocarbon, reaction product gas stream 73 is primarily carbon dioxide and water, the normal products of combustion, and unreacted fuel, if there is an excess of fuel, or oxygen, if the process is run fuel-lean. Preferably, excess fuel is not present in separator section 52 when reactive conditions are unfavorable for the ion transport material in that section.

The heat generated by the reaction of reactive gas stream 72 with the permeating oxygen is transferred from reactor section 51 of reactor-separator-cooler tube 55 to shroud tube 56 by convection and radiative processes and from there to feed gas stream 61 flowing on the outside of shroud tube 56. Local heat transfer coefficients are adjusted by variable baffle spacing or insulation to create a reasonably uniform reactor-separator-cooler tube 55 temperature. At the same time, cool feed gas stream 62, directed by baffles 60, flows in cooling section 53 of the apparatus, cools the gas stream in the interior of reactor-separator-cooler tube 55, and the resultant gas stream, now at elevated temperature, flows into concentric annular passage 68 along with feed gas stream 61. Reaction product gas stream 73 flows to separation section 52 of the apparatus and purges the separator section 52 of reactor-separator-cooler tube 55 to enhance the chemical driving potential across the membrane so that oxygen permeates through tube 55 to provide enriched oxygen product gas stream 74 which is cooled by the flow of cool feed gas stream 62 and which contains oxygen as well as the reaction products produced in reactor section 51 of the apparatus. Enriched oxygen product gas stream 74 exits the apparatus by product exit port 76. An oxygen-depleted product gas stream 78 at high pressure may also be recovered.

Figure 3:
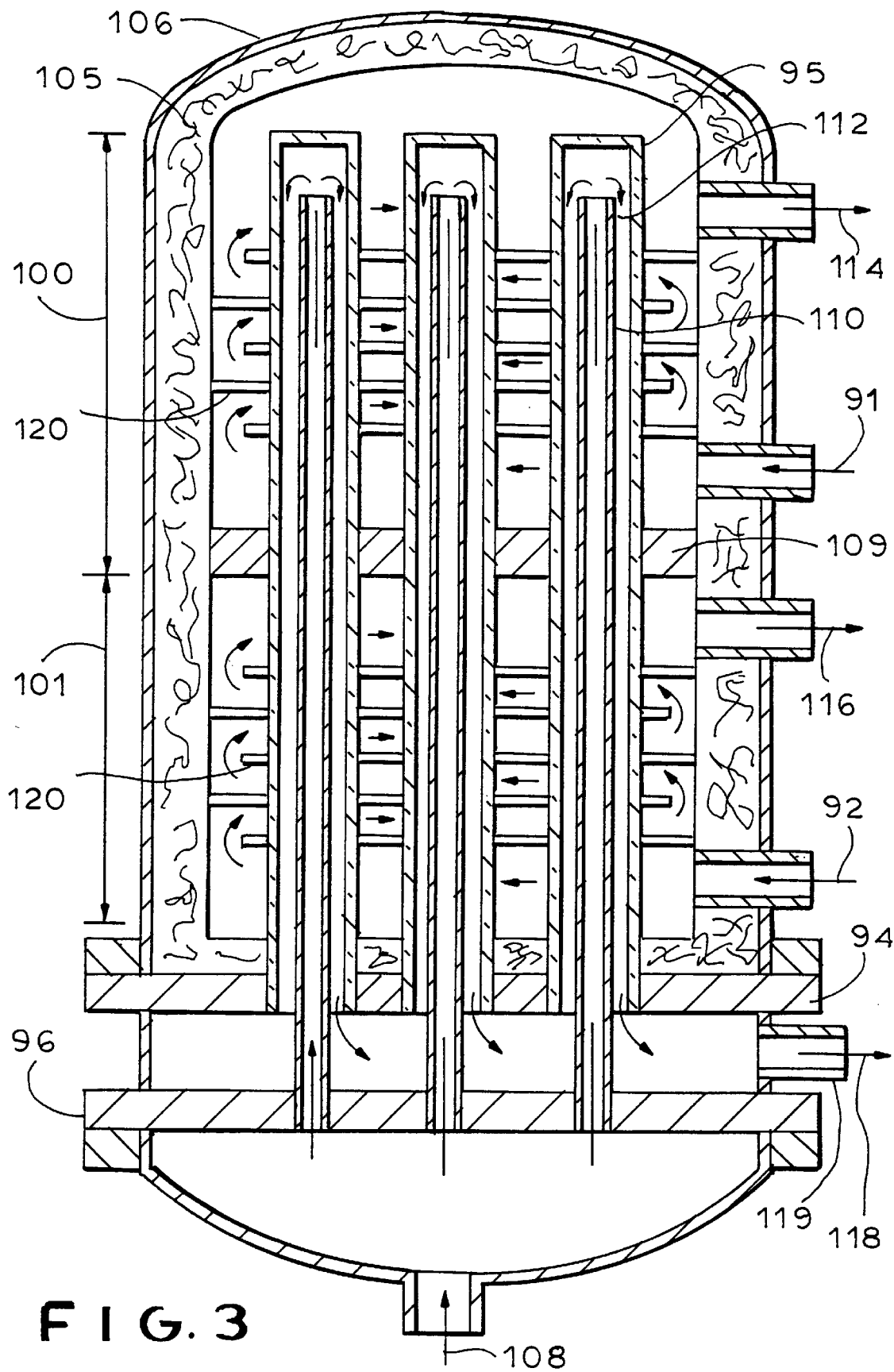
FIG. 3 is a schematic diagram of an embodiment of the invention showing a basic design of a solid electrolyte ionic conductor separator-cooler featuring an ion transport tube with a closed and free-floating end.

The embodiment of the invention shown in FIG. 2 illustrates a possible use of a purge gas stream, such as steam or reaction products from an ion transport reactor (carbon dioxide and water), to purge the anode of the ion transport membrane and thereby lower the partial oxygen pressure at the anode and increase the driving force for oxygen separation, leading to less separator area and/or recovery of a greater amount of the oxygen contained in the feed gas. FIGS. 2 and 3 show modifications to the basic separator-cooler apparatus which permits the use of such a purge gas while maintaining all of the previously cited advantages for the separator-cooler. The embodiment of the invention shown in FIG. 3, discussed below, differs from that of FIG. 2 in that the embodiment of FIG. 2 generates the purge gas in a reactor section within the apparatus, while the purge gas used in FIG. 3 may be generated elsewhere or provided from an external source.

FIG. 3 is a schematic diagram of an embodiment of the invention showing a basic design of a solid electrolyte ionic conductor separator-cooler featuring a tube with a free-floating closed end and an internal purge feed tube for a fuel or externally-generated purge gas stream. As in FIG. 1A, a feed gas stream containing elemental oxygen is compressed and divided into two portions to be fed into the reactor-separator-cooler apparatus and one portion is heated. During operation, hot feed gas stream 91 is introduced into reactor section 100 and cool feed gas stream 92 is fed into cooler section 101. Ion transport separator-cooler tubes 95 traverse both separator section 100 and cooler section 101 of the apparatus. Ion transport separator-cooler tubes 95 are capped and free-floating at the upper end of the apparatus as shown, pass through tube sheet 109, and are attached to tube sheet 94 at the bottom of the apparatus. As before, since tube sheet 94 will be at a temperature of less than 300° C., standard techniques of joining can be employed to effect the separator-cooler tube 95-tube sheet 94 joints. Similarly, insulation 105 insulates the structural pressure-containing walls 106 of the apparatus to permit use of standard materials of construction. As with FIG. 1A, the same tube 95 can be employed in separator section 100 and cooler section 101 of the apparatus and may be constructed as discussed above.

Hot feed gas stream 91 flows past the outside surface of separator-cooler tubes 95 directed by baffles 120. At the same time, purge gas stream 108 flow into the apparatus and is directed by purge feed tubes 110 attached to tube sheet 96. Purge gas stream 108 is substantially at the same temperature (100° C. to 300° C.) as cool air stream 92 when it enters the apparatus and is warmed by heat transfer with the hot product gas stream in annular passage 112. Purge gas stream 108 then flows into concentric annular passages 112 formed between the inner surface of separator-cooler tubes 95 and the outer surface of purge feed tubes 110. Purge feed tubes 110 extend almost the entire length of separator-cooler tubes 95. Purge gas stream 108 purges the permeate side of separator-cooler tubes 95 and enhances the oxygen extraction from hot feed gas stream 91 as it flows past the outside surface of separator-cooler tubes 95 and exits the apparatus as oxygen-depleted gas stream 114, which may be recovered as a product. At the same time, cool feed gas stream 92, directed by baffles 120, flows in cooling section 101 of the apparatus, cools the mixed gas stream in the interior of separator-cooler tube 95, and the resultant gas stream, now at elevated temperature, exits the apparatus as heated gas stream 116. Heated gas stream 116 may be added to feed gas stream 91 before it enters the apparatus or, although not shown, may be added to feed gas stream 91 after it does so. Purge gas stream 108, now mixed with oxygen permeate, and cooled by the flow of cool feed gas stream 92, exits the apparatus as product gas stream 118 by product exit port 119.

It can be readily seen that all of the advantages of the embodiment of FIG. 1A are preserved since all tube ends are free-floating and the flow arrangement for the cooling air stream is unchanged. It is desirable to have the purge gas stream enter at a sufficiently low temperature to facilitate sealing at the tube-to-tube sheet joint and to heat the purge gas stream to ion transport membrane operating temperature by being in a counterflow arrangement with the exiting product oxygen-purge gas mixture.

FIG. 4 is a schematic diagram of another embodiment of the invention showing a basic design of a solid electrolyte ionic conductor reactor-separator-cooler. As in FIG. 1A, a feed gas stream containing elemental oxygen is compressed and divided into two portions to be fed into the reactor-separator-cooler apparatus. The apparatus utilizes three concentric tubes: shroud tubes 149 connected to top tube sheet 150 and open at the bottom of separator section 131, ion transport reactor- separator-cooler tubes 145 closed at the top and attached to middle tube sheet 144; and inner feed tubes 154 open at the top and attached to bottom tube sheet 155. Insulation 165 insulates the structural pressure-containing walls 166 of the apparatus to permit use of standard materials of construction. Tube sheets 144 and 155 will be at a temperature of less than 300° C. and standard techniques of joining can be employed to effect all of the tube-to-tube sheet joints. Tube sheet 150 will be at a higher temperature but the seal is less critical than the other joints because there is only a small pressure difference across the seal. Ion transport reactor-separator-cooler tube 145 traverses reactor section 130, separator section 131, and cooler 132, of the apparatus. The sections 130, 131 and 132 in effect operate as separate stages by performing different functions under different operating conditions. Similar modifications to reactor-separator-cooler tube 145 that were mentioned with regard to the embodiment of FIG. 2 may be used for the embodiment of FIG. 4. Cooling section 132 is separated from separator section 131 by baffle 158 with flow openings 157.

During operation, feed gas stream 135 is introduced into reactor section 130 and cool feed gas stream 142 is fed into cooler section 132. Reactive gas stream 160, with or without a diluent, is fed through inner feed tubes 154. Feed gas stream 135 flows past the outside surface of shroud tube 149 directed by baffles 168 and is warmed by heat transfer with shroud tube 149 and flows into concentric annular passage 164 formed between the outer surface of reactor-separator-cooler tube 145 and the inner surface of shroud tube 149.

Optionally, the first portion of reactor-separator-cooler tubes 145 may be operated with a nonreactive purge gas stream, in effect creating a three-stage separator where a nonreactively purged section precedes the reactively purged section which is followed by a second nonreactively purged section. This option is illustrated in the central reactor-separator-cooler tubes 145 of the apparatus and is accomplished by adding a flow limiting small orifice 182 of a predetermined size at the top end of ion transport tube 145, thereby introducing a product purge stream and terminating inner feed tube 154a at an earlier point. If such an arrangement is used, there should also be a baffle 184 at the inner tube top end to divert reactive gas stream 160 as it exits inner feed tube 154a. The motivation for choosing this option would be to avoid exposure of the closed ion transport tube end to a highly reducing environment, which exists with a reactively purged anode and highly pure nitrogen product at the cathode, and threatens material stability. Alternatively, a small amount of feed gas stream can be added to reactive gas stream 160 so as to greatly raise the partial oxygen pressure in the purge gas stream at the product nitrogen gas stream end while still keeping it sufficiently low to maintain adequate driving force for oxygen transport. Typically the partial oxygen pressure in the purge gas may be raised from $10^{-20}$ to $10^{-14}$ atm.

Absent this modification, reactive gas stream 160 flows through an annular passage formed between the inner surface of reactor-separator-cooler tube 145 and the outer surface of inner feed tube 154 down reactor-separator-cooler tube 145 and reacts with the oxygen permeating from feed gas stream 135 through reactor-separator-cooler tube 145 to provide hot reaction product gas stream 170 in the interior of tube 145. A proper proportioning of gas stream flows ensures that the fuel in reactive gas stream 160 will be exhausted at a point partially down annular passage 162. The heat generated by the reaction of reactive gas stream 160 with the permeating oxygen is transferred from reactor-separator-cooler tube 145 to shroud tube 149 by convection and radiative processes. At the same time, cool feed gas stream 142, directed by baffles 168, flows in cooling section 132 of the apparatus, cools the gas stream in the interior of reactor-separator-cooler tube 145, and the resultant gas stream, now at elevated temperature, flows through flow openings 157 in baffle 158 to join feed gas stream 135 to travel up annular passage 164. Thus, hot reaction product gas stream 170 flows to separation section 131 of the apparatus and purges reactor-separator-cooler tube 145 to enhance the chemical driving potential across the membrane so that oxygen permeates through tube 145 to provide enriched oxygen product gas stream 180 which has been cooled by the flow of cool feed gas stream 142, directed by baffles 133, and which contains oxygen as well as the reaction products produced in reactor section 130 of the apparatus. Enriched oxygen product gas stream 180 exits the apparatus by product exit port 181. If reactive gas stream 160 consisted of methane or another hydrocarbon, enriched oxygen product gas stream 180 will contain primarily oxygen, carbon dioxide and water.

As in previous embodiments discussed, cool feed gas stream 142, which is the minor portion of the original feed gas stream, enters at the bottom of the cooler section 132, passes through flow openings 157, and is recuperatively heated by the countercurrent permeate product flow and thereby performs the cooling function. The reactor function, as illustrated in FIG. 4 and previously, heats feed gas stream 135, which is the major portion of the original feed gas stream, as it flows downward in cross counter flow by the reaction occurring at the wall of reactor-separator-cooler tube 145. As in FIGS. 1A and 3, all the tube ends are free-floating to avoid stresses from thermal and compositional dimensional changes and the bottom tube sheet is cool to facilitate tube-to-tube sheet joints and seals. The quality of this seal is somewhat related to the purity requirements for the nitrogen stream. As in all the embodiments, the shell side of the apparatus is equipped with baffles 168 to enhance heat transfer. In reactor section 130, baffles 168 have variable spacing: wider where the temperature difference between the shell-side gas stream and shroud tubes 149 is high and smaller where this difference is small. The purpose of this variable spacing of baffles 168 is to maintain a constant heat flux in reactor section 130 and minimize temperature variations in the ion transport elements. As mentioned previously, shroud tubes 149 enjoy favorable radiation heat transfer coupling with the ion transport reactor tube surface. Although not shown, the design may also call for insulating the shroud tube in the vicinity of the feed entrance where the T's can be very large.

The embodiment of the invention shown in FIG. 4, as with all the embodiments provided, can be used for many functions. For example, the apparatus can be used as a two-stage Deoxo apparatus with the first stage reaction purged and the second stage pressure purged with combustion product purge, or as a separator to extract oxygen from feed air and produce carbon dioxide from combustion products from an integrated gas turbine cycle, or as a device to separate air into a nitrogen product gas stream and an oxygen product gas stream which contains some carbon dioxide and water which have to separated downstream from the apparatus.

Figure 5:
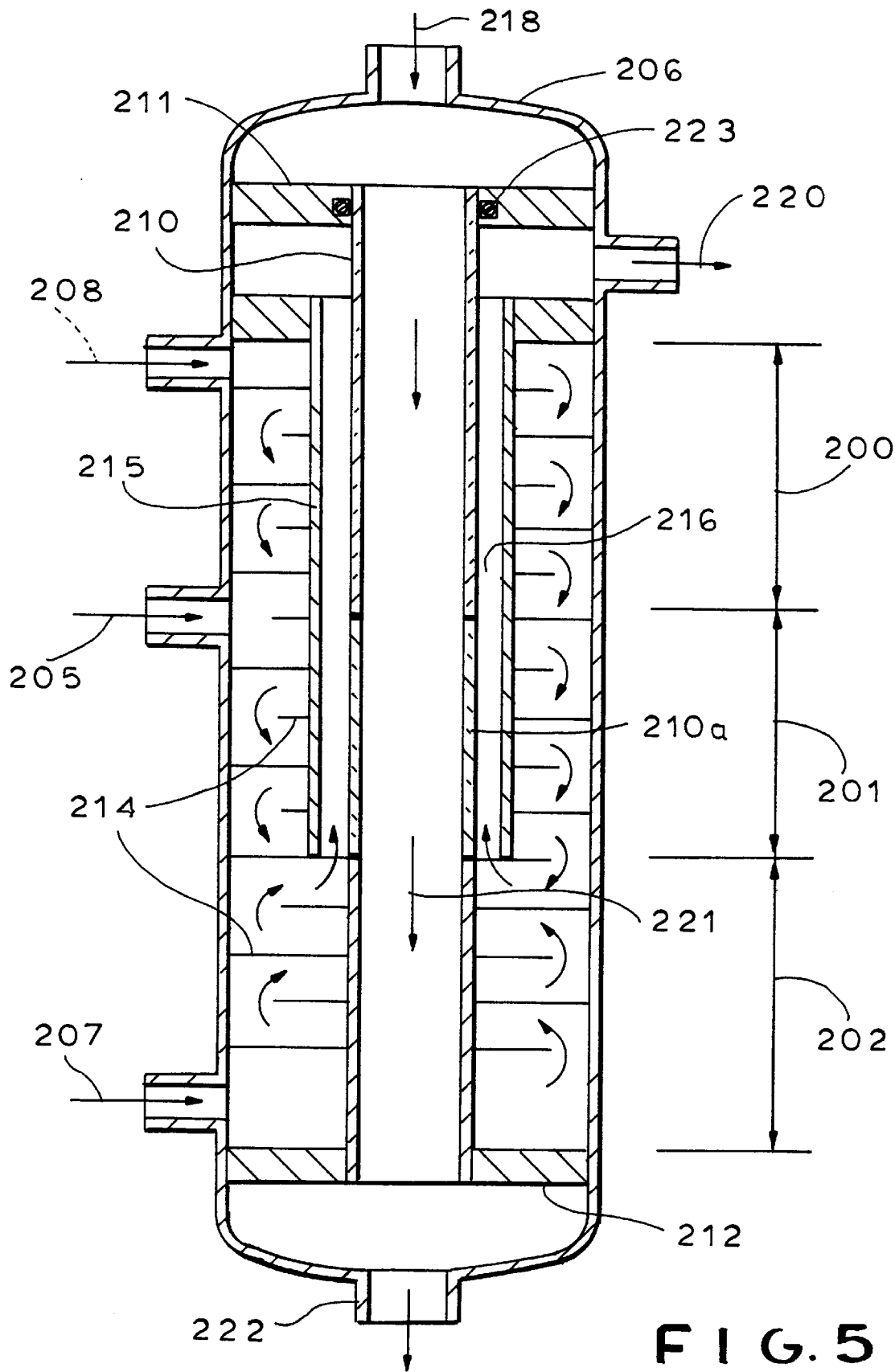
FIG. 5 is a schematic diagram of an embodiment of the invention showing a basic design of a solid electrolyte ionic conductor reactor-cooler featuring an ion transport through tube with a sliding seal and having the ability to cool both retentate and permeate streams therefrom.

FIG. 5 is a schematic diagram of another embodiment of the invention showing a basic design of a solid electrolyte ionic conductor reactor-cooler. As in FIG. 1A, a feed gas stream containing elemental oxygen is compressed and divided into at least two portions to be fed into the reactor-cooler apparatus. During operation, feed gas stream 205 is introduced into active reactor section 201 and cool feed gas stream 207 is fed into reaction product cooler section 202. Optionally, a second cool feed gas stream 208 is fed into nitrogen product cooler section 200. Ion transport reactor-cooler tube 210 traverses all sections 200, 201, and 202 of the reactor-cooler. Ion transport reactor-cooler tube 210 is attached to tube sheet 211 at the upper end of the apparatus by means of a sliding seal 223 or a fixed seal with a bellows and is attached and sealed to tube sheet 212 at the bottom of the apparatus. As before, since tube sheet 212 will be at a temperature of less than 300° C., standard techniques of joining can be employed to effect the reactor-cooler tube 210-to-tube sheet 212 joint. Similarly, insulation (not shown) insulates the structural pressure-containing walls 206 of the apparatus to permit use of standard materials of construction. As with previous figures, the same tube 210 can be employed in reactor section 201 and cooler sections 200 and 202 of the apparatus and may be constructed as discussed above. Only central part 210a of reactor-cooler tube 210 need have an active ion transport membrane. As before, a composite tube consisting of a porous supporting tube and a mixed conductor film in the reactor section 201 and a sealing film in the cooler sections 200 and 202 may be used.

Feed gas stream 205 flows past the outside surface of shroud tube 215 directed by baffles 214 and is warmed by heat transfer with shroud tube 215 and flows into concentric annular passage 216 formed between the outer surface of reactor-cooler tube 210 and the inner surface of shroud tube 215. Shroud tube 215 extends slightly beyond reactor section 210 into reaction product cooler section 202 of the apparatus. Reactive gas stream 218, for example, methane, flows down reactor-cooler tube 210 and, once the ion transport tube surface has reached ion transport tube operating temperature, it reacts with the oxygen permeating from feed gas stream 205 through reactor-cooler tube 210 to provide reaction product gas stream 221 in the interior of tube 210. If reactive gas stream 218 consisted of methane or another hydrocarbon, reaction product gas stream 221 would be primarily carbon dioxide and water, the normal products of combustion, and unreacted fuel, if there was an excess of fuel, or oxygen, if the process were being run fuel-lean. The heat generated by the reaction of reactive gas stream 218 with the permeating oxygen is transferred from reactor-cooler tube 210 to shroud tube 215 by convection and radiative processes. At the same time, cool feed gas stream 207, directed by baffles 214, flows in reaction product cooler section 202 of the apparatus, cools the gas stream in the interior of reactor-cooler tube 210, and the resultant gas stream, now at elevated temperature, flows into concentric annular passage 216 along with feed gas stream 205. Thus, reaction product gas stream 221 is cooled by the flow of cool feed gas stream 207 and exits the apparatus by product exit port 222. Oxygen-depleted (nitrogen) product gas stream 220 at high pressure may also be recovered. If this is the case, it is advantageous to use the optional second cool feed gas stream 208 to cool the gas stream in nitrogen product cooler section 200 in a similar way to reaction product cooler section 202.

Figure 6:
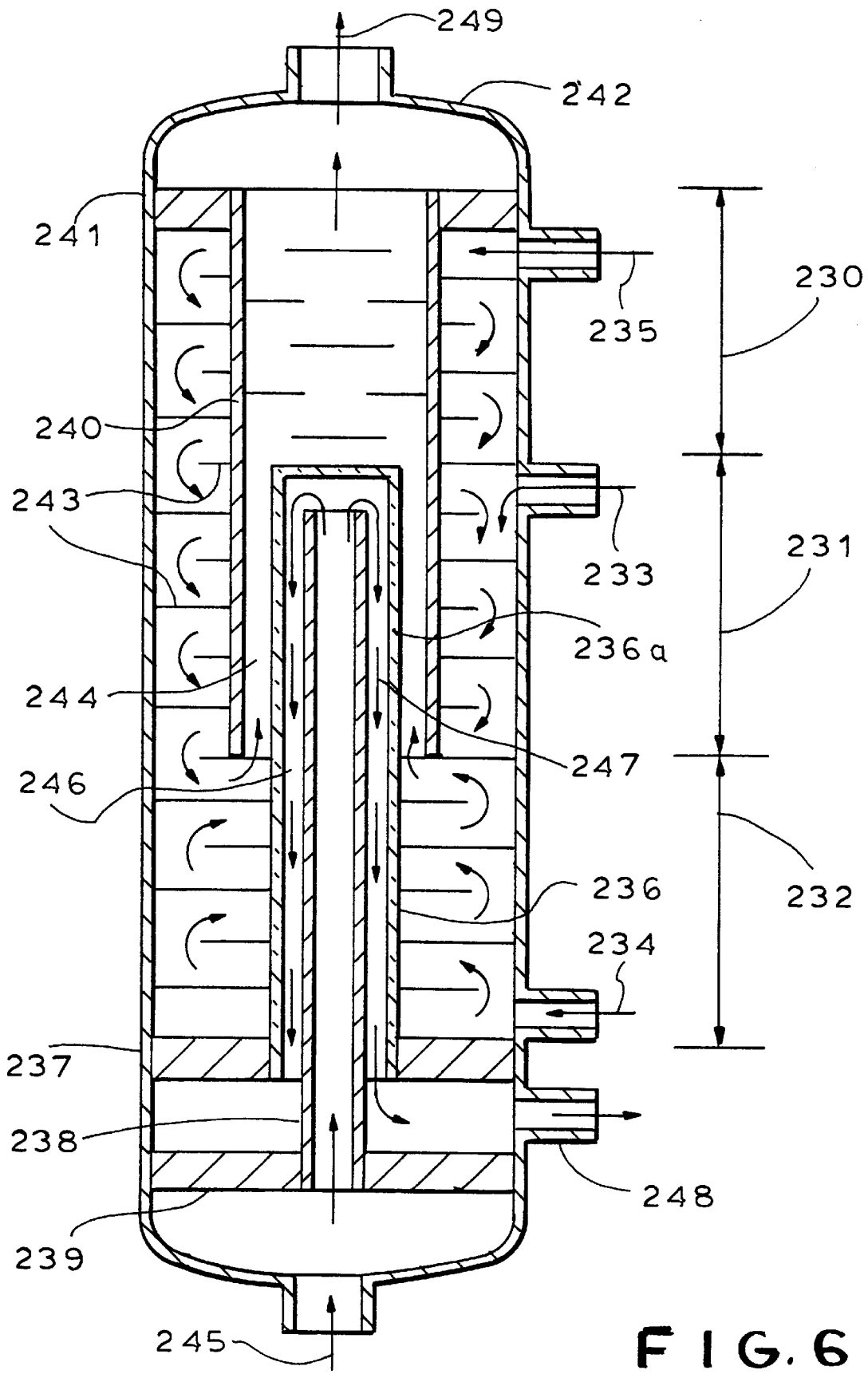
FIG. 6 is a schematic diagram of another embodiment of the invention showing a basic design of a solid electrolyte ionic conductor reactor-cooler featuring an ion transport tube with a closed and free-floating end.

FIG. 6 is a schematic diagram of another embodiment of the invention showing a basic design of another solid electrolyte ionic conductor reactor-cooler. As in FIG. 1A, a feed gas stream containing elemental oxygen is compressed and divided into at least two portions to be fed into the reactor-cooler apparatus. During operation, feed gas stream 233 is introduced into active reactor section 231 and cool feed gas stream 234 is fed into reaction product cooler section 232. Optionally, a second cool feed gas stream 235 is fed into nitrogen product cooler section 230. Ion transport reactor-cooler tube 236 extends through reactor section 231 and cooler section 232 of the reactor-cooler. The apparatus utilizes three concentric tubes: shroud tube 240 connected to top tube sheet 241 and open at the bottom of reactor section 231, ion transport reactor-cooler tube 236 closed at the top and attached to middle tube sheet 237; and inner feed tube 238 open at the top and attached to bottom tube sheet 239. As before, since tube sheets 237, 239, and 241 will be at a temperature of less than 300° C., standard techniques of joining can be employed to effect the joints as necessary. Similarly, insulation (not shown) insulates the structural pressure-containing walls 242 of the apparatus to permit use of standard materials of construction. As with previous figures, the same tube 236 can be employed in reactor section 231 and reactor product cooler section 232 of the apparatus and may be constructed as discussed above. Only the top part 236a of reactor-cooler tube 236 need have an active ion transport membrane.

Feed gas stream 233 flows past the outside surface of shroud tube 240 directed by baffles 243 and is warmed by heat transfer with shroud tube 240 and flows into concentric annular passage 244 formed between the outer surface of reactor-cooler tube 236 and the inner surface of shroud tube 240. Shroud tube 240 extends slightly beyond reactor section 231 into reaction product cooler section 232 of the apparatus. Reactive gas stream 245, for example, methane, optionally diluted with steam, flows up inner feed tube 238, down annular passage 246 formed between the inner surface of reactor-cooler tube 236 and the outer surface of shroud tube 240, and reacts with the oxygen permeating from feed gas stream 233 through reactor-cooler tube 236 to provide reaction product gas stream 247 in the interior of tube 236. If reactive gas stream 245 consisted of methane or another hydrocarbon, reaction product gas stream 247 would be primarily carbon dioxide and water, the normal products of combustion, and unreacted fuel, if there was an excess of fuel, or oxygen, if the process were being run fuel-lean. The heat generated by the reaction of reactive gas stream 245 with the permeating oxygen is transferred from reactor-cooler tube 236 to shroud tube 240 and inner tube 238 by convection and radiative processes. At the same time, cool feed gas stream 234, directed by baffles 243, flows in reaction product cooler section 232 of the apparatus, cools the gas stream in the interior of reactor-cooler tube 236, and the resultant gas stream, now at elevated temperature, flows into concentric annular passage 244 along with feed gas stream 233. Thus, reaction product gas stream 247 is cooled by the flow of cool feed gas stream 234 and exits the apparatus by product exit port 248. Oxygen-depleted (nitrogen) product gas stream 249 at high pressure may also be recovered. If this is the case, it is advantageous to use the optional second cool feed gas stream 235 to cool the gas stream in nitrogen product cooler section 230 in a similar way to reaction product cooler section 232.

Figure 8:
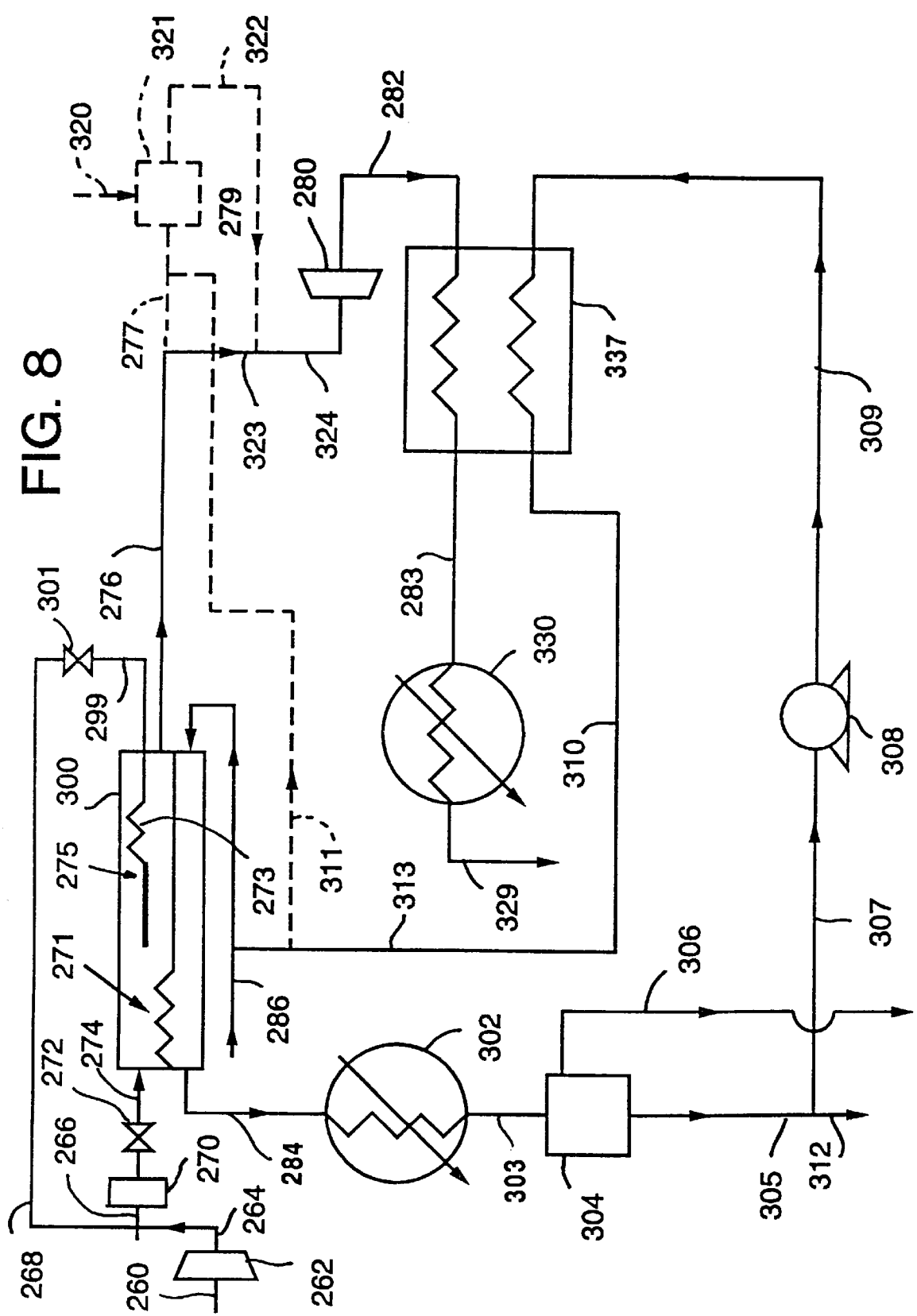
FIG. 8 is a schematic diagram showing a complete oxygen/nitrogen separation cycle using a reactor-separator-cooler of the present invention.

FIG. 8 illustrates the simplicity of a complete oxygen/nitrogen separation cycle using a reactor-separator-cooler module 300 according to the present invention. Feed gas stream 260, usually air, is compressed by compressor 262 to obtain compressed gas stream 264. Compressed gas stream 264 is divided into major feed gas stream 268 and minor feed gas stream 266. Minor feed gas stream 266 is cooled in cooler 270 and then proceeds through valve 272. Cooled gas stream 274 is introduced into cooler section 271 of ion transport module 300. Major feed gas stream 268 passes through valve 301 to become major gas stream 299 which is introduced to reactor section 273 of ion transport reactor 300. In one embodiment, gas stream 286 is a reactive gas stream and major gas stream 299 is heated in reactor section 273 of ion transport module 300 to about 900° C. by the reaction of gas stream 286 and the oxygen on the anode side of the ion transport membrane of reactor section 273 of ion transport module 300. In another embodiment, gas stream 286 is an unreactive diluent gas stream which is used to purge the anode side of the ion transport membrane of the reactor section 273 and separator section 275 of ion transport module 300. The energy for heating feed gas stream 274 is provided by the countercurrent anode product stream.

The system illustrated in FIG. 8 in effect utilizes a reaction-driven deoxo stage 273 and a pressure-driven oxygen separation stage 275 which is enhanced by a combustion product purge including species such as water (as steam) and carbon dioxide. The two gas streams leaving ion transport module 300 are cool low pressure gas stream 284 containing oxygen, carbon dioxide and water, and a high pressure and high temperature nitrogen product stream 276.

Low pressure gas stream 284 containing oxygen, carbon dioxide, and water vapor is cooled by cooler 302 to produce gas stream 303. The bulk of the water contained in gas stream 303 is condensed by condenser 304 to produce water stream 305 and gas stream 306 which contains primarily oxygen and carbon dioxide. Gas stream 306 is sent to downstream separation by membrane, adsorption or absorption processes. Water stream 305 may be discarded as water stream 312 or may become water stream 307 which is pumped by pump 308 to become water stream 309. Water stream 309 is passed through heat exchanger 337 for heating with gas stream 282 to become steam, that is, gas stream 310. Gas stream 310 is optionally divided into gas stream 311 and gas stream 313. As mentioned above, gas stream 286, either reactive or unreactive, is fed into reactor section 275 of ion transport module 300.

Nitrogen product stream 276 is optionally divided into gas stream 277, shown in phantom, and gas stream 323. If produced, gas stream 277 joins with optional gas stream 311, shown in phantom as diverting from stream 310, to become gas stream 279. Gas stream 279 and reactive gas stream 320 are fed into combustor 321 for combustion to produce gas stream 322. Gas stream 322 is joined with gas stream 323 to produce gas stream 324. Gas stream 324 in one embodiment is expanded in gas turbine 280 or the heat energy can be recovered by a Rankine cycle steam system The Rankine cycle steam system introduces additional complexities but has the advantage of delivering product nitrogen at pressure. In the embodiment shown using gas turbine 280, there is sufficient heat available in turbine exhaust gas stream 282 for the generation of steam gas stream 310, by heating water stream 305 in heat exchanger 307, for the further enhancement of oxygen flux in ion transport module 300, as mentioned above. Gas stream 282 passes through heat exchanger 307 to become gas stream 283. Gas stream 283 passes through cooler 330 to become gas stream 329, which is usually discarded.

Figure 9:
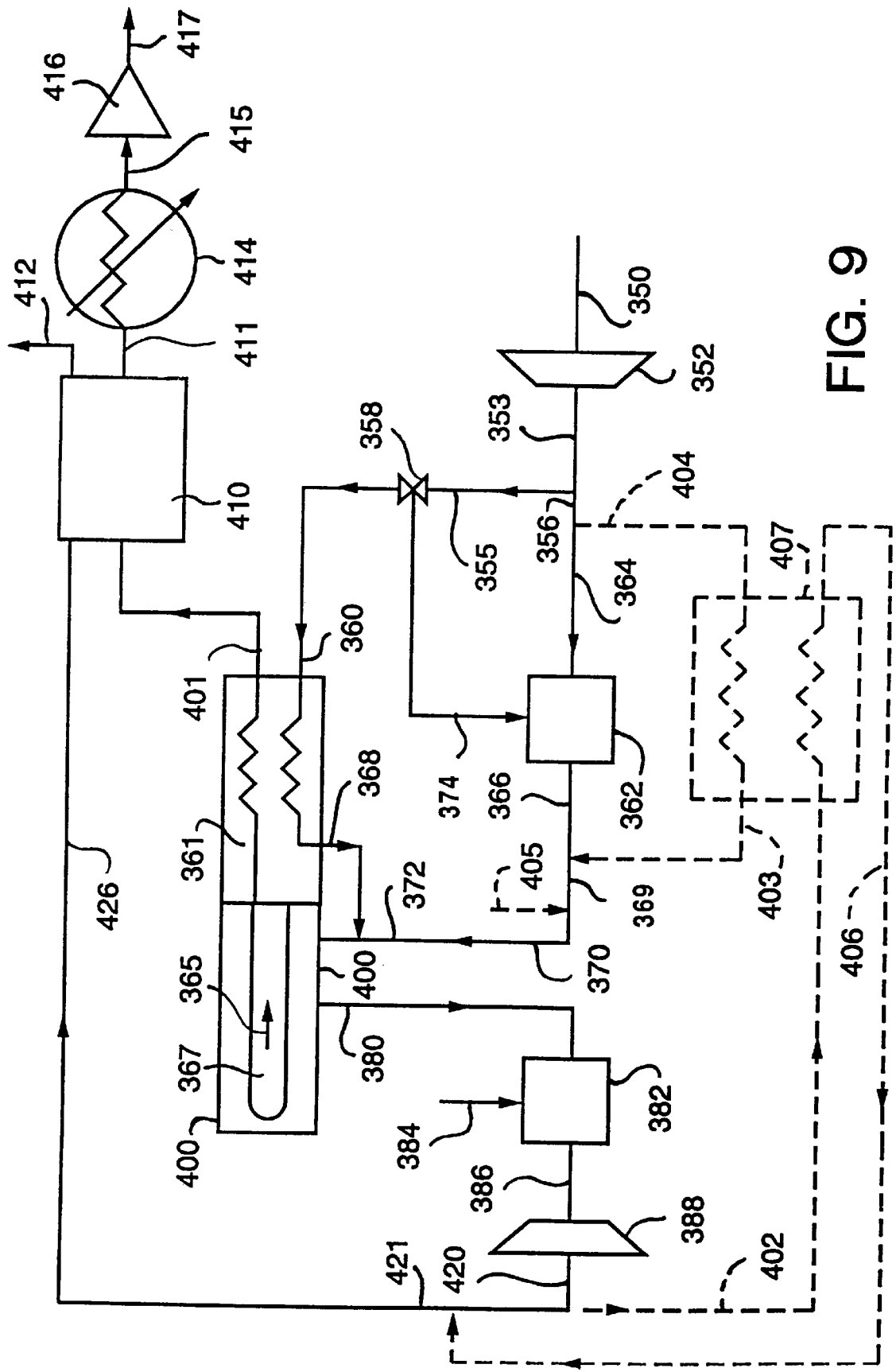
FIG. 9 is a schematic diagram showing an ion transport reactor-separator-cooler of the present invention integrated into a gas turbine cycle.

FIG. 9 illustrates the integration of an ion transport separator-cooler into a gas turbine cycle according to the present invention. Feed gas stream 350, for example, air, after being compressed in compressor 352 to produce compressed feed gas stream 353, is divided into major feed gas stream 356 and minor feed gas stream 355. Minor feed gas stream 355 proceeds through valve 358 to produce gas stream 360 which is introduced into cooler section 361 of separator-cooler module 400 and is then heated and exits separator-cooler module 400 as gas stream 368.

Major feed gas stream 356 is optionally divided into gas stream 364 and gas stream 404. Gas stream 364 is heated to ion transport membrane operating temperature (about 900° C.) in combustor 362 after fuel gas stream 374 is added to produce gas stream 366. An ion transport reactor or an externally fired heater can be substituted for combustor 362 without affecting the functionality of the system. Gas stream 404 passes through optional heat exchanger 407 to produce heat gas stream 403 which is joined with gas stream 366 to produce gas stream 369. Optional reactive gas stream 405 is added to gas stream 367 to produce gas stream 370. Gas stream 368 is added to gas stream 370 to produce gas stream 372, which is introduced into separator section 363 of separator-cooler module 400 where oxygen 365 is removed using ion transport tube 367.

Following the removal through ion transport membrane 367 in the separator section 363 of separator-cooler module 400 of portion 365 of the oxygen 365 contained in gas stream 372, gas stream 380 exits separator-cooler module 400 and is heated to turbine inlet temperature in combustor 382 after fuel gas stream 384 is added. Resulting gas stream 386 is expanded in turbine 388 to form turbine exhaust stream 420. Gas stream 420 is optionally divided into gas stream 402 and gas stream 421. Gas stream 402, if produced, is passed through heat exchanger 407 to produce gas stream 406. Gas stream 406 is added to gas stream 421 to produce gas stream 426.

In the case shown, waste heat is recovered by Rankine steam cycle 410 as follows. Oxygen product gas stream 401 exits cooler section 361 of separator-cooler module 400 at a temperature of about 150° C. to 300° C. If the temperature levels permit, some of the heat contained in product oxygen gas stream 401 and turbine exhaust stream 426 is recovered by Rankine steam cycle 410. A recuperator can be used in place of Rankine stream cycle 410 to recover the excess heat contained in turbine exhaust stream 426 and oxygen product gas stream 401. Rankine stream cycle 410 produces waste gas stream 412, which is usually discarded, and oxygen gas stream 411. Oxygen gas stream 411 is then cooled by cooler 414 to produce oxygen gas stream 415 which is compressed by compressor 416 to produce oxygen gas stream 417 which is recovered as the product.

As discussed above, it is likely that different solid electrolyte ionic conductor materials will be selected for the reactor and separator duties to provide optimum service. Materials selected for reactor service should have maximum stability at low oxygen partial pressures such as the chromium-containing perovskites listed in Table I and materials selected for oxygen separation service should be those having high ionic conductivity at high partial oxygen pressures.

Specific features of the invention are shown in one or more of the drawings for convenience only, as each feature may be combined with other features in accordance with the invention. In addition, various changes and modifications may be made to the examples given without departing from the spirit of the invention. Alternative embodiments will be recognized by those skilled in the art and they are intended to be included within the scope of the claims.

What is claimed is:

1. A process for producing an oxygen gas stream or oxygen-enriched gas stream and an oxygen-depleted gas stream by first separating oxygen from a feed gas stream containing elemental oxygen and thereafter cooling the oxygen gas stream or oxygen-enriched gas stream obtained therefrom, within a single apparatus, the apparatus having a separator section and a cooling section and an oxygen product exit port, wherein the separator section includes an ion transport membrane having a retentate side and a permeate side, said process comprising:

(a) compressing the feed gas stream;

(b) dividing the compressed feed gas stream into a major gas stream portion and a minor gas stream portion;

(c) heating the major gas stream portion;

(d) introducing the heated major gas stream portion into the separator section of the apparatus;

(e) introducing the minor gas stream portion into the cooling section of the apparatus near the oxygen product exit port;

(f) removing oxygen from the heated major gas stream portion through the ion transport membrane of the separator section to obtain a hot oxygen-enriched gas stream on the permeate side of the membrane and an oxygen-depleted gas stream on the retentate side of the membrane; and (g) transferring heat from the oxygen-enriched gas stream to the minor gas stream portion to produce the oxygen gas stream or the oxygen-enriched product gas stream and a heated minor gas stream portion, wherein the minor gas stream portion either exits the apparatus or is combined with the heated major gas stream portion before the heated major gas portion is introduced into the separator portion of the apparatus, and wherein the oxygen-depleted gas stream exits the apparatus.

2. The process according to claim 1 wherein the apparatus further comprises a reactor section, including an ion transport membrane having a retentate side and a permeate side and wherein a reactive gas stream is introduced on the permeate side of the ion transport membrane in the reactor section of the apparatus, to react with a second oxygen gas stream permeating through the ion transport membrane near the permeate side of the ion transport membrane, to produce a reaction product gas stream which is used to purge the permeate side of the ion transport membrane in the separator section of the apparatus, and wherein the reaction product gas stream and the first oxygen gas stream and any unreacted oxygen from the second oxygen gas stream are combined as the oxygen-enriched gas stream which exits the apparatus, and wherein the oxygen-depleted gas stream separately exits the apparatus.

3. The process according to claim 2 wherein the ion transport membrane of the separator section of the apparatus and the ion transport membrane of the reactor section of the apparatus are integrally formed.

4. The process according to claim 3 wherein the ion transport membrane of the separator section of the apparatus includes a porous supporting substrate and comprises an ion transport material having high oxygen conductivity at high oxygen partial pressure and the ion transport membrane of the reactor section of the apparatus comprising a mixed conductor layer having optimum stability at low oxygen partial pressure.

5. The process according to claim 3 wherein the ion transport membrane of the reactor section of the apparatus and the ion transport membrane of the separator section of the apparatus are integrally formed with a conduit for carrying the oxygen-enriched gas stream through the cooler section of the apparatus.

6. The process according to claim 5 wherein the conduit for carrying the oxygen-enriched gas stream through the cooler section of the apparatus is a metallic tube and is joined to the ion transport membrane of the reactor section of the apparatus by welding or brazing the joint therebetween.

7. The process according to claim 5 wherein the conduit for carrying the oxygen-enriched gas stream through the cooler section of the apparatus comprises a dense sealing material and is joined to the ion transport membrane of the reactor section of the apparatus by welding or brazing the joint therebetween.

8. The process according to claim 2 wherein the reactive gas is heated before it is introduced into the reactor section of the apparatus.

9. The process accordingly to claim 1 wherein the separator section includes a reactor section and step (f) includes introducing a reactive gas stream on the permeate side of the ion transport membrane to react with at least a portion of transported oxygen.

10. A process for producing an oxygen-depleted gas stream and a reaction product gas stream by first separating oxygen from a feed gas stream containing elemental oxygen to produce the oxygen-depleted gas stream and a hot reaction product gas stream and thereafter cooling the reaction product gas stream, within a single apparatus, to obtain the reaction product gas stream, the apparatus having a reactor section and a cooling section and a reaction product exit port, wherein the reactor section includes an ion transport membrane having a retentate side and a permeate side, said process comprising:

(a) compressing the feed gas stream;

(b) dividing the compressed feed gas stream into a major gas stream portion and a minor gas stream portion;

(c) introducing the major gas stream portion into the reactor section of the apparatus;

(d) introducing the minor gas stream portion into the cooling section of the apparatus near the reaction product exit port;

(e) removing oxygen from the major gas stream portion through the ion transport membrane of the reactor section, by introducing a reactive gas stream on the permeate side of the ion transport membrane in the reactor section of the apparatus to react with the oxygen gas stream permeating through the ion transport membrane near the permeate side of the ion transport membrane, to produce the hot reaction product gas stream on the permeate side of the ion transport membrane and the oxygen-depleted gas stream on the retentate side of the ion transport membrane; and (f) transferring heat from the hot reaction product gas stream to the minor gas stream portion to produce the reaction product gas stream and a heated minor gas stream portion, wherein the minor gas stream portion either exits the apparatus or is combined with the heated major gas stream portion before the heated major gas portion is introduced into the reactor portion of the apparatus, and wherein the oxygen-depleted gas stream also exits the apparatus.

11. The process according to claim 10 wherein the major gas stream portion is heated to an intermediate temperature before it is introduced into the reactor section of the apparatus.

12. The process according to claim 10 wherein the reaction product gas stream is essentially devoid of nitrogen.

13. The process according to claim 10 wherein the reaction product gas stream is primarily carbon dioxide and water or syngas.

14. The process according to claim 10 wherein the ion transport membrane of the reactor section of the apparatus and a conduit for carrying the reaction product gas stream through the cooler section of the apparatus are integrally formed.

15. The process according to claim 14 wherein the conduit for carrying the reaction product gas stream through the cooler section of the apparatus is a metallic tube and is joined to the ion transport membrane of the reactor section of the apparatus by welding or brazing the joint therebetween.

16. The process according to claim 14 wherein the conduit for carrying the permeate and reaction product gas streams is a composite tube comprising a porous support and at least one porous intermediate layer coated with an ion transport material in the reactor section of the apparatus and a dense inert seal in the cooler section of the apparatus.

17. A process for producing an oxygen-enriched gas stream and an oxygen-depleted gas stream by separating oxygen from a feed gas stream containing elemental oxygen within an apparatus, the apparatus having a reactor section and a separator section, wherein the reactor and separator sections each include at least one ion transport membrane having a retentate side and a permeate side, said process comprising:

(a) compressing the feed gas stream;

(b) introducing the compressed feed gas stream into the apparatus and transferring heat from a reaction products gas stream to the feed gas stream;

(c) removing oxygen from the heated feed gas stream by transport through the ion transport membrane in the reactor section of the apparatus to produce a reaction product gas stream on the permeate side of the membrane and a partially oxygen-depleted gas stream on the retentate side of the membrane;

(d) removing additional oxygen from the partially oxygen-depleted gas stream by transport through the ion transport membrane in the separator section of the apparatus to produce the oxygen-depleted gas stream on the retentate side of the membrane;

wherein a reactive gas stream is introduced on the permeate side of the ion transport membrane in the reactor section of the apparatus to react with the oxygen transporting through the ion transport membrane near the permeate side of the membrane to produce the reaction product gas stream which is used to purge the permeate side of the ion transport membrane in the separator section of the apparatus; and wherein the reaction product gas stream and unreacted transported oxygen are combined as the oxygen-enriched gas stream which exits the apparatus, and wherein the oxygen-depleted gas stream separately exits the apparatus.

18. The process according to claim 17 wherein the ion transport membrane of the separator section of the apparatus and the ion transport membrane of the reactor section of the apparatus are integrally formed.

19. The process according to claim 18 wherein the ion transport membrane of the separator section of the apparatus includes a porous supporting substrate and comprises an ion transport material having high oxygen conductivity at high oxygen partial pressure and the ion transport membrane of the reactor section of the apparatus conductor a mixed conductor layer having optimum stability at low oxygen partial pressure.

20. The process according to claim 17 wherein the reactive gas heated before it is introduced into the reactor sector of the apparatus.

* * * * *

UNITED STATES PATENT AND TRADEMARK OFFICE
CERTIFICATE OF CORRECTION

PATENT NO. : 5,820,654
DATED : October 13, 1998
INVENTOR(S) : Gottzmann et al.

It is certified that error appears in the above-indentified patent and that said Letters Patent is hereby corrected as shown below:

In Claim 19, line 6, delete "conductor", and insert --comprising-- therefor.

In Claim 20, line 2, following "gas", insert --is--, and delete "sector", and insert --section-- therefor.

Signed and Sealed this

Twenty-sixth Day of January, 1999

Attest:

Attesting Officer

*Acting Commissioner of Patents and Trademarks*